L. S. CHICHESTER.
Grain Drier.
No. 49,470.
Patented Aug. 15, 1865.
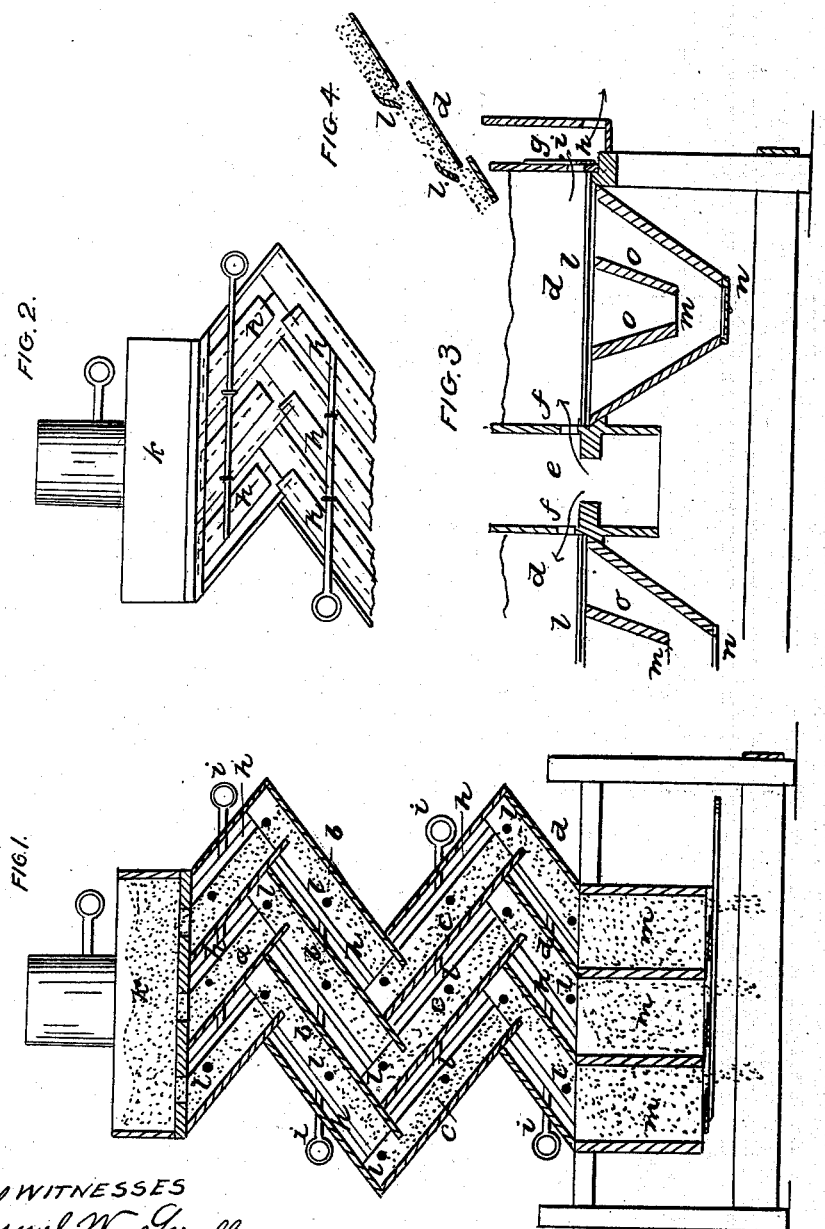
WITNESSES
Lemuel W. Serrell
Chas H. Smith
INVENTOR
Sam'l S. Chichester

UNITED STATES PATENT OFFICE.

LEWIS S. CHICHESTER, OF BROOKLYN, NEW YORK, ASSIGNOR TO HIMSELF AND C. W. MILLS, OF SAME PLACE.

IMPROVED GRAIN-DRIER.

Specification forming part of Letters Patent No. 49,470, dated August 15, 1865; antedated August 11, 1865.

*To all whom it may concern:*

Be it known that I, LEWIS S. CHICHESTER, of Brooklyn, in the county of Kings and State of New York, have invented, made, and applied to use a certain new and useful Improvement in Drying Grain; and I do hereby declare the following to be a full, clear, and exact description of the said invention, reference being had to the annexed drawings, making part of this specification, wherein—

Figure 1 is a vertical section of said grain-drier. Fig. 2 is an elevation of the dampers at the end of a portion of the tables. Fig. 3 is a section through the delivery-hopper, showing also the lower end of the inclined table for the grain; and Fig. 4 is a section representing a modification in the table for the grain.

Similar marks of reference denote the same parts.

Grain-driers have heretofore been made of a series of tables inclined in alternate opposite directions, over which the grain runs, and is dried by heated air; and such tables have been surrounded by a casing forming a hot-air chamber; but the space between these tables is so great that a very large volume of air has to be heated, and it is not confined in contact with the grain. Hence much heat is wasted, and the apparatus is very bulky and exposes comparatively little grain to the drying operation at one time.

The nature of my said invention consists in a series of inclined or zigzag tables packed together, so that but a small air-space is left between the grain on one table and the bottom of the next and parallel table, by which means the heated air is confined into the spaces between the respective tables, and it is allowed to escape in a regulated quantity sufficient to convey away the vapors expelled from the grain, and at the same time the table immediately above said air-space is heated by the passage of hot air beneath it. I provide dampers to regulate the escape of air, and the grain is supplied in such a manner that it passes in a sheet or stratum over the drying-tables, and the required thickness is maintained and the grain prevented from banking up thicker at the bottom than at the top by placing across such tables bars or supports at the desired distance above said tables, which supports arrest the further flow of grain so soon as said grain banks up beneath and reaches said supports. The grain banks up the table from this support to the next above, and so on. Thereby the whole of the tables are covered with a complete layer of grain, and when grain is drawn away from the lower edge of the tables the said grain moves bodily down with a speed proportioned to the amount of grain passing away. Thus a uniform thickness is maintained, while the stratum has a gradual and constant movement, and the grain is agitated and stirred up in passing between these supports.

I construct my hopper so that the grain will be taken away uniformly from the lower edge of the last table, and will move down the entire width of the inclined tables with a uniform velocity, whereas if the ordinary hopper were used the grain would flow away faster from the central portion of the inclined tables than from the sides, causing the grain at the side to move too slowly, and rendering it liable to be scorched or unequally dried.

In the drawings, $a\ a\ a$ are a series of inclined tables, sloping in one direction and nearly parallel to each other. $b\ b\ b$ are a series of inclined tables, parallel, or nearly so, to each other, but sloping in the opposite direction to the tables $a\ a$; and $c\ c\ c$ are a third series of tables, nearly parallel to $a$, and $d\ d\ d$ are a fourth series, nearly parallel to $b\ b\ b$. These tables form a series of zigzags set together, and leaving sufficient space between one table and the next for a layer of grain and for a current of air to pass over one table and below the next, and the end of one table is a sufficient distance from the surface of the next below to allow an opening or mouth for the grain to pass down from one table to another. The ranges of tables thus formed are inclosed, as shown, so as to confine the heated air to the grain, and at one end of the tables a hot-air trunk, $e$, is provided, communicating by openings at $ff$ with the air-spaces between the tables, and at the other end is an air-chest, $g$, receiving and conveying away the heated air and vapors from the grain.

The air should be supplied to the trunk $e$ from any suitable furnace, and may be forced in by a blower, or an exhaust-blower may be used to draw the air from the chest $g$, according to the character of grain or the extent of moisture contained in said grain.

At the ends of the ranges of tables I provide dampers $h\ h$, actuated by sliding rods $i\ i$, by which the amount of opening from the air-spaces between the tables to the air-chest $g$ may be regulated so as to direct the more or less heated air over the respective ranges of tables, according to the condition of the grain. These dampers are shown as attached diagonally to the respective rods, so that one rod operates one range of dampers.

It is preferable that two separate series or congeries of these zigzag tables be employed, one on each side of the hot-air trunk $e$, as illustrated by Fig. 3, and each series or congeries may be composed of any desired number of these zigzag ranges of tables.

The grain is supplied from a hopper or hoppers, $k$, through long narrow slots, passing the grain to the top ends of the upper range of inclined tables $a\ a$.

If the tables were at an inclination corresponding with the sides of a mass of grain heaped together, there would be no certainty of damp grain sliding down such an inclination, and with a sufficiently-steep inclination the grain would bank up and become a thicker layer at the bottom of the table than at the top. I therefore place across the tables bars or supports $l\ l$, beneath which the grain flows and commences to bank up at the bottom of the tables until it fills up to the first of these bars, which prevents grain sliding over the surface of the grain already on the table. Hence said grain will commence to bank up from this support to the next one above, resulting in the entire tables being filled with a stratum of grain of nearly uniform thickness, and as soon as grain is allowed to run off from the lowest table the entire mass of grain commences to move and slides down with a speed proportioned to the velocity at the point of delivery, and when the delivery is stopped the motion of the stratum of grain also stops. Thus the time that the grain remains in the apparatus will be determined by the size of opening through which the grain escapes. These bars or supports $l\ l$ may be placed at any desired distance above the surface of the tables, and the grain sliding beneath them causes an agitation and mixing of the particles that are partially detained with those that do not touch the said supports, thus preventing wet grain becoming caked; and, if desired, the bars or supports can be placed at different distances from the tables, so as to aid in thoroughly mixing the grain.

I prefer that these bars or supports should be from three-eighths of an inch to one inch from the surface of the tables.

The tables may be formed with openings, as seen in Fig. 4, so that the heated air will circulate through said openings and among the grain as it slides down the said tables, and the supports or bar $l$ may be made of corrugated sheet metal, as shown in the same figure.

The hopper $m$ is adapted to taking the grain from all the tables; but there is a separate section allotted to each table, and a valve or slide, $n$, to regulate the escape of the grain. I also introduce in each section of the hopper the inclined partitions $o\ o$, that terminate a short distance from the opening at the bottom. These partitions are placed so as to cause the grain to flow from the sides as fast as from the central portion of the inclined tables, thereby producing uniformity in the movement of the grain over the tables instead of the grain passing away more quickly from the center, as in an ordinary hopper.

With a wide table it may be necessary to has more than two of these partitions $o\ o$.

I am aware that a series of rakes or bars have been suspended above a table upon which grain is dried.

What I claim, and desire to secure by Letters Patent, is—

1. A series of tables inclined in alternate opposite directions and placed together in a zigzag form, as specified, so as to leave a space above the grain between one table and the next for the passage of air, as set forth.

2. A stationary support or bar placed across and above an inclined table to support the grain and cause it to form a layer of nearly uniform thickness, substantially as specified.

3. The regulating-dampers at the ends of the air-spaces between the tables, in combination with a series of tables set together in a zigzag form, as specified.

4. The hopper formed with partitions standing at an inclination to each other, in combination with an inclined table for grain, as specified, whereby the grain is taken away from the lower edge of the said inclined table with uniformity, as set forth.

5. An inclined table to contain a layer of grain to be dried, and provided with a narrow space above and below said table, through which a current of heated air is passed, as and for the purposes specified.

In witness whereof I have hereunto set my signature this 11th day of January, 1865.

LEWIS S. CHICHESTER.

Witnesses:
LEMUEL W. SERRELL,
CHAS. H. SMITH.